Figure 1:
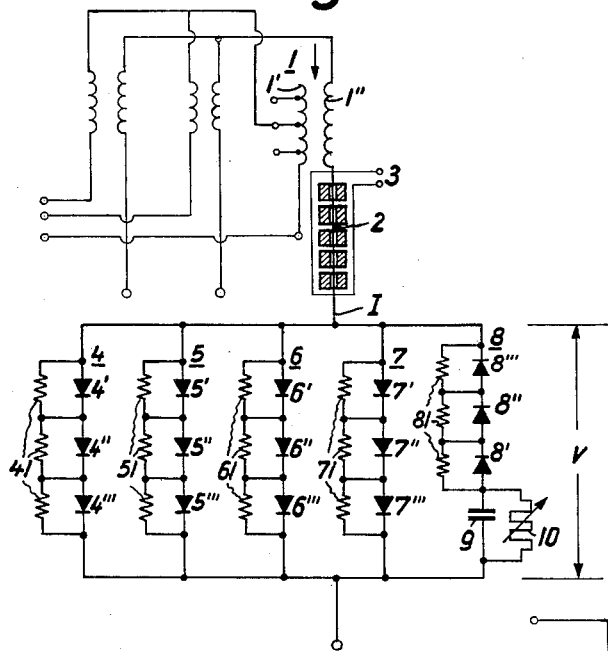

May 2, 1961 F. KOPPELMANN 2,982,904
RECTIFIERS
Filed Aug. 19, 1958

Inventor:
FLORIS KOPPELMANN
BY Toulmin & Toulmin
ATTORNEYS

United States Patent Office 2,982,904
Patented May 2, 1961

2,982,904
RECTIFIERS

Floris Koppelmann, Berlin-Siemensstadt, Germany, assignor to Licentia Patent-Verwaltungs-G.m.b.H., Hamburg, Germany Filed Aug. 19, 1958, Ser. No. 755,925
Claims priority, application Germany Aug. 21, 1957
7 Claims. (Cl. 321—11)

The present invention relates to rectifiers.

More particularly, the present invention relates to heavy duty multiple phase rectifiers which incorporate semi-conductor rectifiers means, such as germanium or silicon blocking layer rectifier cells.

In rectifiers incorporating vapor or gas discharge paths a certain time interval is required to permit the discharge paths to de-ionize, and the more abrupt the rate of current decrease prior to the time the current attains a value of zero, the greater this time interval is. A similar effect has been found to take place in the case of rectifiers incorporating modern blocking layer cells, e.g., germanium or silicon cells. During the period of conductivity, charge carriers accumulate in the semi-conductor at a high rate, and a certain amount of time is required to permit interfusion or recombination. If the cells are subjected to a high voltage before the charge carriers are diffused, the dielectric strength of the cells is very substantially decreased.

The present invention is based on the above observation, and it is an object of this invention to provide a rectifier which overcomes such disadvantage. To this end, means in the form of a saturable reactor are provided for decreasing the rise of the blocking voltage at such time as the current ceases to flow, so as to give the charge carriers in the semi-conductor sufficient time to decay. Thus, the circuit of each phase of a multiple phase rectifier according to the present invention comprises a main rectifier circuit incorporating rectifier means which permit the flow of current in one direction, a saturable reactor connected in series with the main rectifier circuit, and an auxiliary rectifier circuit which is connected across the main rectifier circuit and which incorporates rectifier means that permit the flow of current in a direction opposite to the one direction and a damped capacitor circuit, i.e., a parallel resistor-capacitor circuit, connected in series with the last-mentioned rectifier means. The capacitor prevents the flow of short-circuit currents, and limits the current flow to a surge which charges the capacitor. The capacitor is discharged through the resistor which is connected thereacross, the time interval required for this discharge being determined by the capacitance of the capacitor and the resistance of the resistor. This time interval is so selected that at the start of each cycle the capacitor is either partially or completely discharged.

The present invention is of particular importance in the case of rectifiers operating at high amperage. Such rectifiers require a large number of individual rectifier cells which are arranged in series, parallel or series-parallel circuit, so that the expense of the cells must be considered. It is, therefore, essential that each individual cell can be called upon to operate at maximum current and voltage so that the total number of cells may be maintained within a reasonable limit, and also so that the reliability and useful life of the cells are kept at their maximum.

It is a further object of the present invention to provide a rectifier the voltage of which may easily be regulated, and according to the present invention the saturable reactors which serve to delay the voltage increase are also used for controlling the rectifier voltage magnetically. Inasmuch as blocking layer cells per se are not capable of being controlled and the voltage of existing rectifiers can be adjusted in a stepwise manner only, the magnetic control exercised through the intermediary of the saturable reactor can be used to obtain a continuously variable control of the rectifier voltage.

Figure 3:
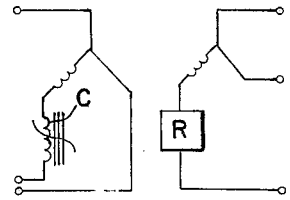
Figure 2:
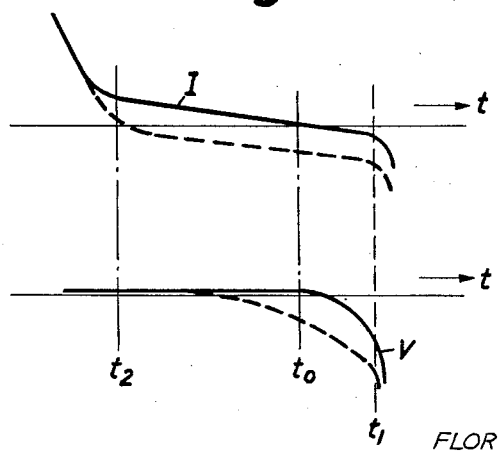

The invention will be better understood by the following detailed description thereof taken in conjunction with the accompanying drawings, in which Fig. 1 is a circuit diagram of a multiple phase rectifier according to the present invention, one phase of the rectifier being shown in detail;

Fig. 2 is a graph showing the current through and the voltage across each rectifier phase as a function of time; and Fig. 3 is a simplified circuit diagram of a modification of the multi-phase rectifier shown in Fig. 1.

Referring now to the drawings and to Fig. 1 thereof in particular, there is shown in detail one phase of a multiple phase rectifier according to the present invention. The phase has a transformer 1 the primary winding 1' of which is provided with taps and the secondary winding 1" of which is connected in series-circuit with a saturable choke or reactor 2 and with main and auxiliary rectifier circuits to be described. The reactor is provided with pre-exciting or polarizing or biasing means which may be in the form of one or more windings constituted by one or more rings 3 which encompass the copper conductor of the reactor, these rings being cold-rolled elements made of a ferromagnetic material such as ferronickel or ferrosilicon. This reactor is non-saturated only when the current flowing through the reactor is near zero, which is but a small part of each cycle, and is fully saturated the remainder of the time. The state of magnetization is controlled by the ring windings, of which there are usually between five to ten, but under certain conditions a single winding may suffice.

The main rectifier circuit is shown as comprising four parallel branches 4, 5, 6 and 7, which branches incorporate a plurality of serially connected rectifier cells 4', 4", 4'''; 5', 5", 5'''; 6', 6", 6'''; 7', 7", 7''', respectively, resistors being connected across each cell for dividing the phase voltage equally among the individual cells. As is shown in Fig. 1, each rectifier cell 4', 4" and 4''' has a resistor 41 connected across it, each rectifier cell 5', 5" and 5''' has a resistor 51 connected across it, each rectifier cell 6', 6" and 6''' has a resistor 61 connected across it, and each rectifier cell 7', 7" and 7''' has a resistor 71 connected across it. The auxiliary rectifier circuit 8 is shown as comprising three serially connected rectifier cells 8', 8" and 8''' each of which has a voltage dividing resistor 81 connected across it, and a damped capacitor circuit connected in series with the rectifier cells 8', 8" and 8'''. All of these rectifier cells are normally in the form of a semi-conductor such as a germanium or silicon blocking layer rectifier cell, and the damped capacitor circuit is made up of a capacitor 9 which may have a capacitance of the order of 10 to $10^3/\mu F$. and a variable resistor 10 the resistance of which may, depending upon the capacity of the capacitor 9, be varied within a range lying between 10 and $10^4$ ohms. As is clearly shown in Fig. 1, rectifier cells of the auxiliary rectifier circuit 8 permit the flow of current in a direction opposite to that in which the rectifier cells of the branches 4, 5, 6 and 7 of the main rectifier circuit permit the flow of current. The other phases are similarly constructed.

Fig. 2 shows the current I through and the voltage V across the illustrated rectifier phase as a function of time, with the solid lines showing the values for the current and voltage under operating conditions at which the pre-exciting means 3 polarize or bias the reactor 2 to such an extent that the flat portion of the current-time curve is partly above and partly below the zero line. Consequently, the current I is greater than zero until the instant $t_0$. Until this instant is reached, the rectifier cells of the main rectifier circuit permit the flow of current without there being a voltage across the phase. However, as soon as the instant $t_0$ is reached, these main rectifier cells suddenly cease to conduct, so that were it not for the auxiliary rectifier circuit, the voltage across the entire phase would, at the instant $t_0$, suddenly be equal to the particular voltage which is across the phase at this instant $t_0$. This sudden rise in the voltage is prevented by the auxiliary rectifier circuit 8 inasmuch as the rectifier cells 8', 8" and 8'" permit the flow of current in the opposite direction during the time interval which elapses between the instants $t_0$ and $t_1$, so that the rate of increase of the voltage V across the phase is limited by the rate at which the capacitor 9 is charged, this rate of increase of the voltage thus being in accordance with the equation $$\frac{dV}{dt} = \frac{I}{C}$$

where I is the current and C the capacitance of the capacitor 9.

If the capacitance of the capacitor is sufficiently great, the voltage may, for a time interval of the order of $10^{-4}$ to $10^{-3}$ seconds, be maintained so small that the rectifier cells 8', 8" and 8'" are not called upon to perform their function.

Were the reactor 2 not pre-excited or biased, the flat portion of the current-time curve would be below the zero line, as shown in Fig. 2 in dotted lines. Under these conditions, the cells of the main rectifier circuit would cease to conduct at the instant $t_2$, and the voltage would commence to increase gradually at the instant $t_2$ and would not attain large values until the instant $t_1$. In that case the time delay until the blocking voltage is applied is large, but the rectifier cells will have conducted large currents just prior to the instant $t_2$, so that many charge carriers will still be present in the semi-conductors.

The optimum pre-excitation of the reactor 2 required to make the best use of the rectifier cells, i.e., the particular point of the cycle at which the flat portion of the current-time curve passes through the zero line, depends upon the characteristics of the cells and the voltages and currents to which these cells are to be subjected. Furthermore, it is possible to move this zero point forward or backward, simply by varying the pre-excitation or bias of the reactor 2. In any event, the pre-excitation of the reactor 2 should be carefully selected so that the back magnetization voltage of the reactor does not increase the requirements of the rectifier cells insofar as their capability of withstanding blocking voltages is concerned.

The auxiliary rectifier circuit 8 has the additional advantage in that it acts as an overload limiting device for damping undesired transient overvoltages, which may be caused by switching operations or may be due to atmospheric influences.

Optimum performance of the auxiliary rectifier circuit 8 may be obtained by adjusting the variable resistor 10, and under certain conditions the premagnetization of the reactor 2, and thereby the phase voltage, can be adjusted by varying the resistor 10. This is so because the power factor of the phase depends upon the back magnetization effect of the auxiliary rectifier circuit.

It will be understood that this invention is susceptible to modification in order to adapt it to different usages and conditions, and, accordingly, it is desired to comprehend such modifications within this invention as may fall within the scope of the appended claims. For example, under certain conditions, the saturation reactor may be connected in series with the primary winding 1' of the transformer 1, as shown schematically in Fig. 3 where the reactor is indicator at C and the rectifier network at R. Since the secondary winding 1" of the transformer is connected in series with the main rectifier circuit 4, 5, 6, 7, the reactor will be in series with the main rectifier circuit through the intermediary of the transformer. The advantage of such an arrangement is that the reactor, when thus connected, takes up part of the alternating input voltage and thus increases the capacity of the transformer. Such an arrangement could be incorporated in a six-phase bridge circuit with open Y-connected secondaries, since in such a circuit the current through the primary and secondary windings has the same shape.

Also, the rectifiers 8', 8" and 8'", instead of being in the form of a semi-conductor, may be constituted by vapor or gas discharge paths.

Furthermore, suitable quick-acting circuit-breaking devices may be provided for protecting the rectifier cells of the main rectifier circuit, it being most desirable that a separate circuit-breaker be provided in each of the branches 4, 5, 6 and 7. It has been found that such protection is not required in the auxiliary rectifier circuit 8 inasmuch as the capacitor 9 itself offers some protection, and also since the rectifier cells 8', 8" and 8'", which need be capable of withstand small current only, may readily be so designed as to have a higher dielectric strength than the rectifier cells of the main rectifier circuit.

What I claim is:

1. A multiple phase rectifier having a plurality of phase circuits each of which comprises a main rectifier circuit incorporating semi-conductor rectifier means which permit the flow of current in one direction; a saturable reactor connected in series with said main rectifier circuit; and an auxiliary rectifier circuit connected across said main rectifier circuit, said auxiliary rectifier circuit incorporating semi-conductor rectifier means which permit the flow of current in a direction opposite to said one direction and a parallel resistor-capacitor circuit connected in series with said last-mentioned semi-conductor rectifier means, said semi-conductor rectifier means being in the form of blocking layer rectifier cells made of material selected from the group consisting of germanium and silicon.

2. A multiple phase rectifier as defined in claim 1 wherein said material is germanium.

3. A multiple phase rectifier as defined in claim 1 wherein said material is silicon.

4. A multiple phase rectifier as defined in claim 1 wherein the resistor of said resistor-capacitor circuit is a variable resistor, whereby the voltage of the rectifier may be regulated.

5. A multiple phase rectifier as defined in claim 1 wherein each phase circuit further comprises pre-exciter means associated with said saturable reactor for pre-exciting the same.

6. A multiple phase rectifier as defined in claim 5 wherein the resistor of said resistor-capacitor circuit is a variable resistor, whereby the voltage of the rectifier may be regulated.

7. A multiple phase rectifier as defined in claim 5 wherein said saturable reactor is connected in series with the primary winding of a transformer the secondary winding of which is connected in series with said main rectifier circuit, whereby said saturable reactor is connected in series with said main rectfier circuit through the intermediary of said transformer.

References Cited in the file of this patent

UNITED STATES PATENTS

| | | |
|---|---|---|
| 2,377,180 | Pohm | May 29, 1945 |
| 2,689,322 | Godshalk et al. | Sept. 14, 1954 |
| 2,895,100 | Filberich et al. | July 14, 1959 |